United States Patent [19]
Docherty

[11] Patent Number: 5,302,004
[45] Date of Patent: Apr. 12, 1994

[54] METHOD OF REMOVING ASBESTOS FROM A BUILDING

[75] Inventor: David B. Docherty, Wexford, Pa.

[73] Assignee: QSI International, Inc., Allison Park, Pa.

[21] Appl. No.: 968,492

[22] Filed: Oct. 29, 1992

[51] Int. Cl.$^5$ .......................... A47L 13/06; B08B 7/04
[52] U.S. Cl. ........................ 299/18; 15/50.3; 134/21; 134/200; 135/900; 299/64
[58] Field of Search ............ 299/64, 18; 15/50.3, 15/52.1; 51/180; 134/21, 200; 135/900; 241/4; 405/128, 129; 588/254

[56] References Cited

U.S. PATENT DOCUMENTS

| | | | |
|---|---|---|---|
| 1,561,250 | 11/1925 | Kunze | 15/50.3 |
| 3,099,852 | 8/1963 | Grant | 15/50.3 |
| 4,752,103 | 6/1988 | Smith | 299/64 |
| 4,765,352 | 8/1988 | Strieter | 135/900 X |
| 4,774,974 | 10/1988 | Teter | 134/110 |
| 4,923,251 | 5/1990 | Funakawa et al. | 299/64 |
| 5,016,314 | 5/1991 | Green et al. | 134/200 |
| 5,021,095 | 6/1991 | Tamaki | 134/21 |
| 5,026,432 | 6/1991 | Johnson | 134/21 |
| 5,047,089 | 9/1991 | Grant | 134/21 |
| 5,067,504 | 11/1991 | Coleman, III | 134/172 |

FOREIGN PATENT DOCUMENTS 2167682 6/1986 United Kingdom ............... 241/4

Primary Examiner—David J. Bagnell
Attorney, Agent, or Firm—Webb, Burden, Ziesenheim & Webb

[57] ABSTRACT

A method for removing asbestos containing material from an area of a building by creating a containment area substantially surrounding the area of the building where the asbestos containing material is located. Removing and compressing compressible asbestos containing material within the containment area and cutting rigid asbestos containing material into pieces within the containment area. Packaging the compressed and cut asbestos containing material for removal from the containment area. Demolishing block walls within the containment area and grinding pieces of the walls into particles for removal from the containment area. Scraping adhering asbestos containing material from surfaces within the containment area and encapsulating the surfaces from which asbestos containing material has been removed with a lock-down agent.

16 Claims, 4 Drawing Sheets

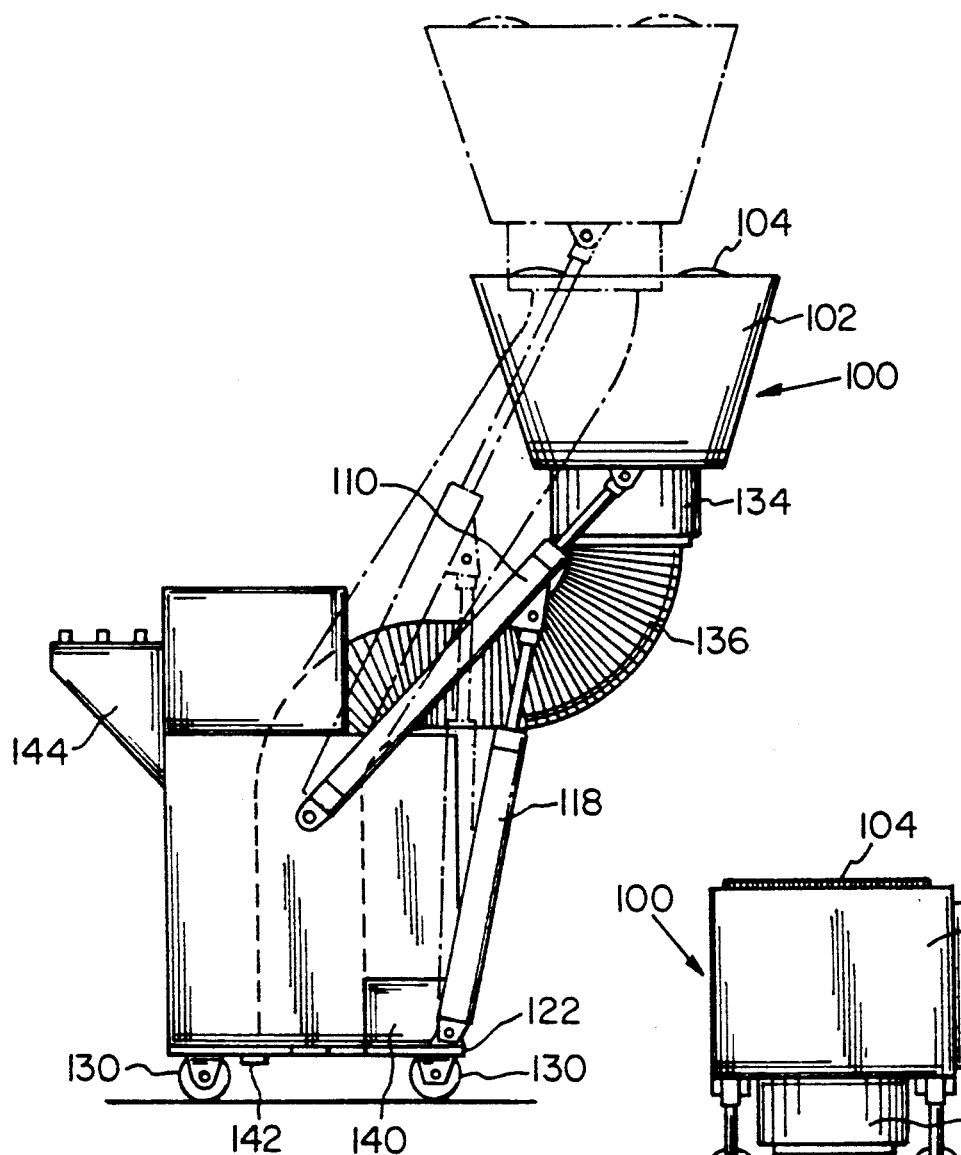
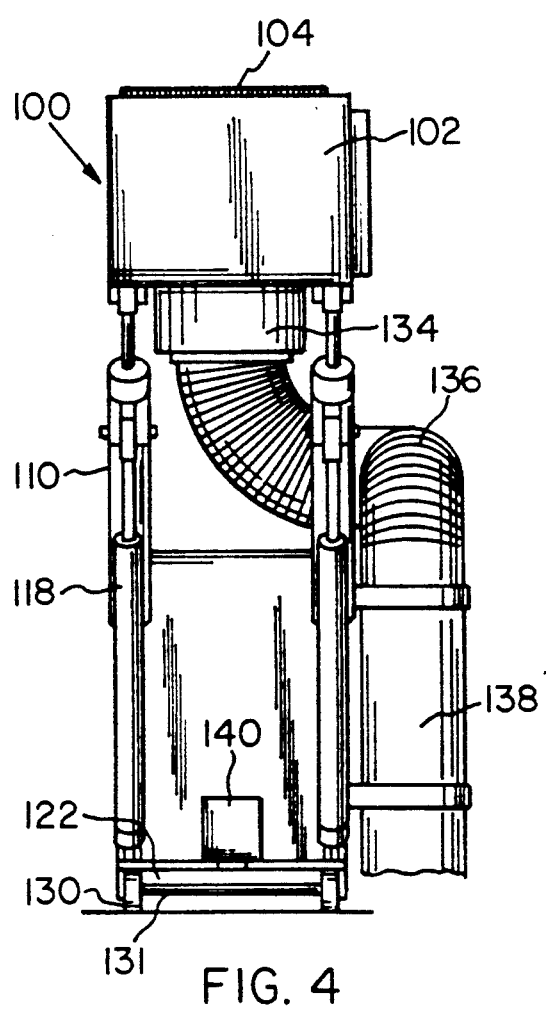
FIG. 3
FIG. 4

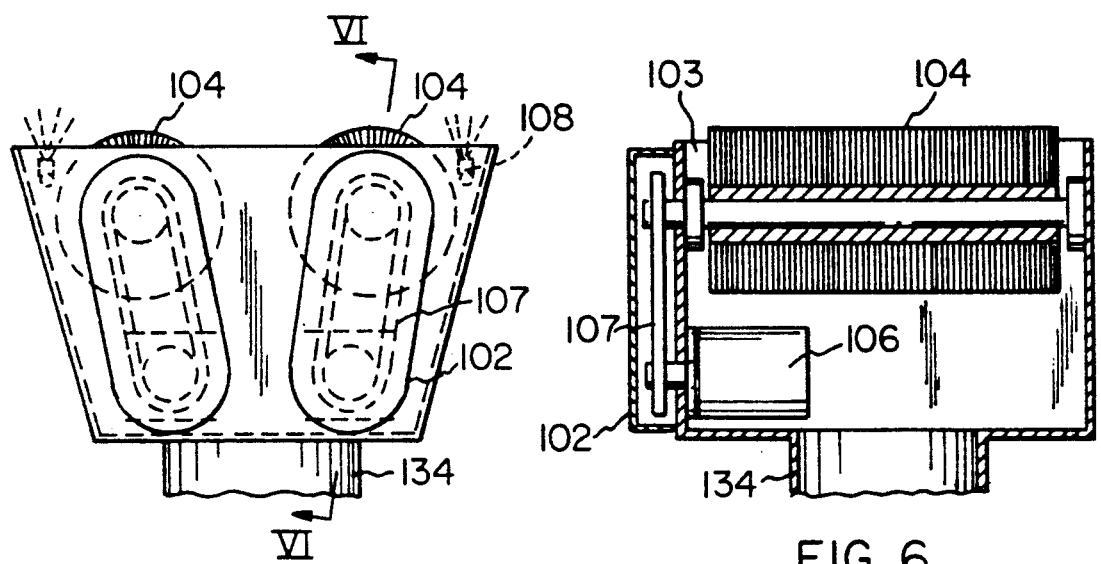
FIG. 5
FIG. 6
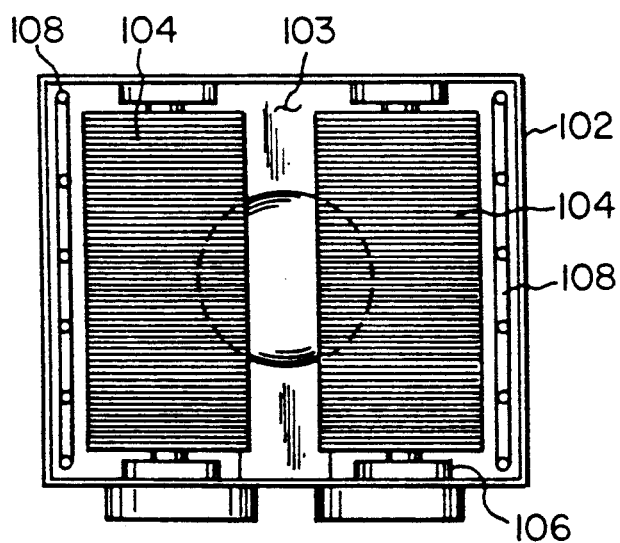
FIG. 7

METHOD OF REMOVING ASBESTOS FROM A BUILDING

BACKGROUND OF THE INVENTION

1. Field of the Invention

This invention relates generally to the removal of contaminate material and, more particularly, to a method and apparatus for the removal of asbestos from a building.

2. Prior Art

The prior art discloses a variety of asbestos removal equipment and methods such as exemplified in U.S. Pat. Nos. 4,774,974; 5,021,095; 5,047,089 and 5,067,504. However, the prior art equipment and methods do not provide a systematic and efficient manner for removing asbestos from contaminated buildings. Additionally, the prior art equipment and methods fail to adequately address the problems associated with the disposal of asbestos after it has been removed. The equipment and method of the present invention overcome many of the inadequacies present in the prior art asbestos removal equipment and methods.

A prior art device for removing asbestos is disclosed in U.S. Pat. No. 4,752,103. However, the device disclosed in that patent lacks sufficient versatility to be utilized effectively on a variety of surfaces in different orientations. The apparatus of the present invention overcomes drawbacks of the prior art devices disclosed in that United States patent.

SUMMARY OF THE INVENTION

The present invention provides a method for removing asbestos from a single-story building or a multiple-story building. The method includes constructing a substantially enclosed containment area from within which the asbestos is to be removed. This substantially closed containment area provides for the total containment of the asbestos and asbestos containing materials within a closed area. Following the construction of the containment area, all of the compressible, non-friable asbestos containing materials located within the containment area are removed and compressed while they are located within the containment area. Any elongated, non-friable asbestos containing materials which have been removed are cut or chopped into relatively small pieces so that they can be packaged for removal from within the containment area to a disposal location such as a landfill. Non-load bearing block walls and partitions located within the containment area are demolished and the pieces of block are ground into gravel-size particles for subsequent removal from the containment area. The next step is to remove fireproofing materials located within the containment area by scraping the walls and the ceilings and removing the product of the scraping from the containment area. Finally, the asbestos-free surfaces located within the containment area are encapsulated with a lock-down agent.

A device according to the present invention which may be utilized to scrape asbestos containing material from surfaces within the containment area includes a housing having an open face which may be directed toward a surface from which asbestos containing material is to be removed. At least one rotary brush is rotatably mounted within the housing adjacent to the open face and the brush is rotated by an electric motor. Spray nozzles are mounted within the housing adjacent to the brush. The housing is mounted on an adjustable support mechanism for positioning the brush relative to a building surface from which asbestos containing material is to be removed. The adjustable support mechanism is pivotably mounted on a movable carriage and is extendable and retractable in a vertical direction. One end of a suction discharge conduit is coupled to a closed end of the housing and the opposite end of the discharge conduit may be connected to a vacuum pipe.

A complete understanding of the invention will be obtained from the following description when taken in connection with the accompanying drawings wherein like reference characters refer to like parts throughout.

BRIEF DESCRIPTION OF THE DRAWINGS

FIG. 3 is a side elevation of an asbestos removal device according to the present invention;

FIG. 4 is an end elevation of the device shown in FIG. 3;

FIG. 5 is a side view of the upper housing of the device shown in FIG. 3;

FIG. 6 is a section on line VI—VI of FIG. 5; and

FIG. 7 is a plan view of the housing shown in FIG. 5.

DESCRIPTION OF THE PREFERRED EMBODIMENT

Figure 1:
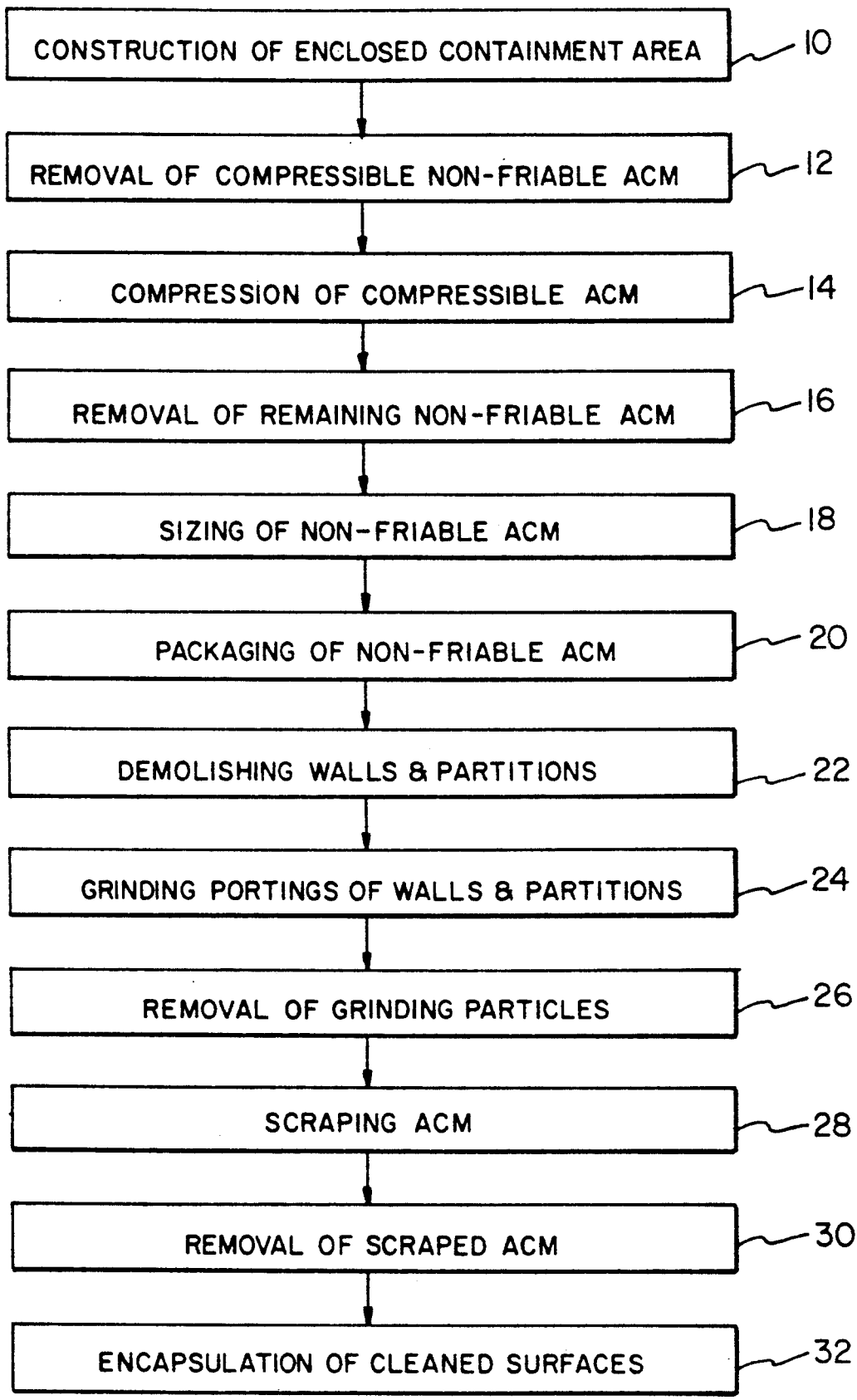
FIG. 1 is a flow diagram showing steps included in the method of the invention.

The method according to the present invention provides an efficient, cost-effective, systematic and hazard-free procedure for asbestos removal. The method may be used in any building but is particularly well suited for asbestos removal from multistory, high-rise buildings. FIG. 1 of the drawings schematically illustrates the steps of the method of the invention.

The first step 10 of the method comprises constructing a substantially completely enclosed containment area from within which asbestos containing materials (ACM) are to be removed. Prior to constructing the containment area, all movable, non-asbestos containing items such as carpets, doors, furniture and the like are removed from the area to be contained. The containment area can be, for example, one whole floor of building from which asbestos is to be removed or a partial floor depending upon the size and design of the building.

Figure 2:
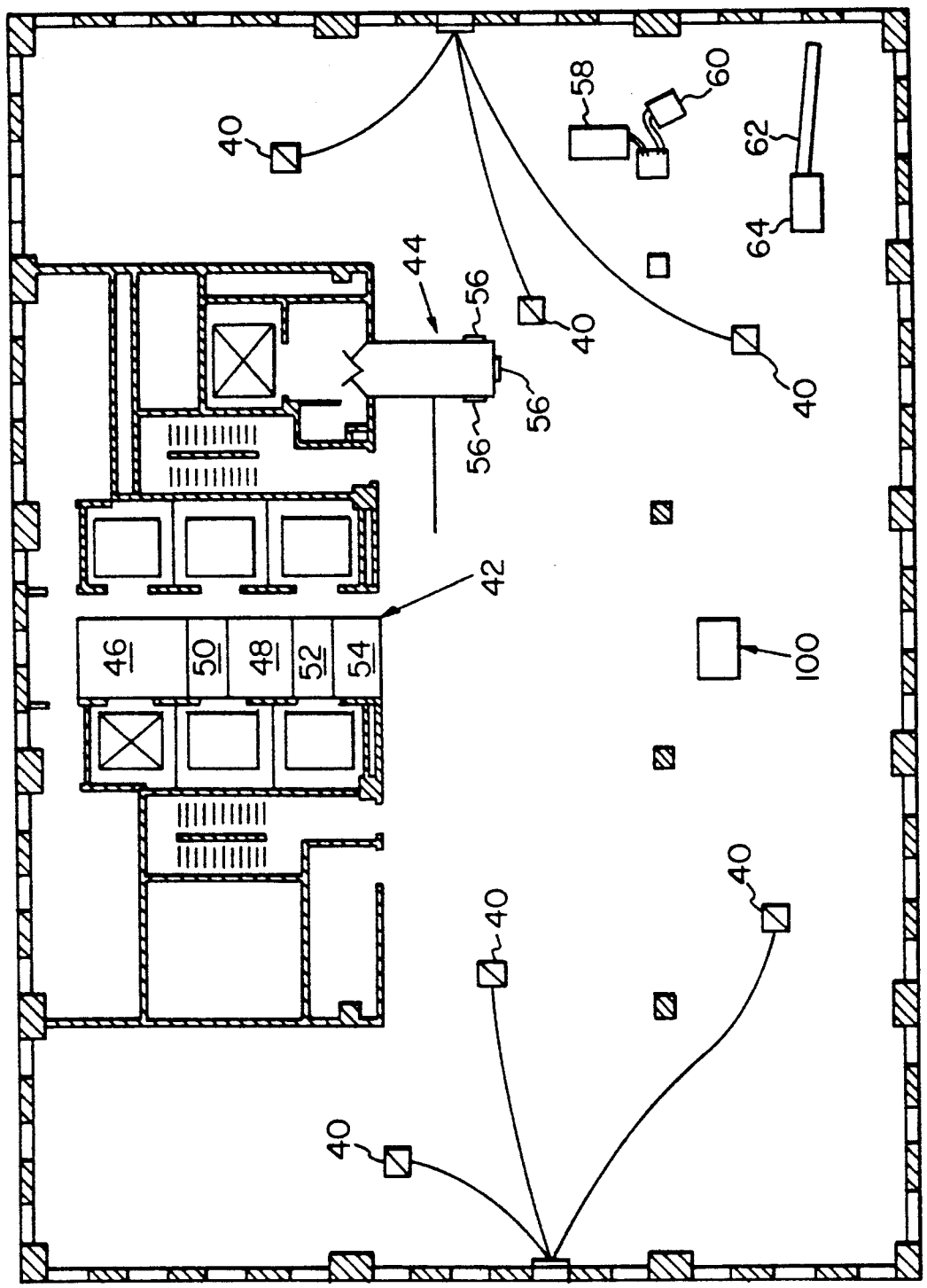
FIG. 2 is a floor plan of an enclosed containment area within a building.

FIG. 2 of the drawings is an exemplary floor plan of a containment area encompassing a complete floor of a building. The building floor is placed under total containment and is substantially sealed with appropriate air inlets and filtration units 40. Air can enter the containment area but can only exit through filtration units 40 which are negative air machines designed to thoroughly clean and filter the air. The exhausts of filtration units 40 may be painted black to minimize the appearance of the units on the building exterior. The construction of the containment area includes erecting a personnel decontamination enclosure 42 and an observation room 44. Decontamination enclosure 42 includes, sequentially, a clean room 46 which is connected to a shower room 48 by an air lock 50. Shower room 48 is connected by a second air lock 52 to a dirty room 54 which is connected to the interior of the containment area. Personnel decontamination enclosure 42 allows workers to enter and exit the containment area without the escape of ACM from the containment area. Observation room 44 has a plurality of windows 56 for visual inspection of the interior of the containment area without passing through the personnel decontamination enclosure 42 into the containment area.

After the containment area is constructed, all compressible, non-friable asbestos containing materials are removed therefrom, as shown at step 12 in FIG. 1 of the drawings. Specifically, components such as ceiling tiles and light fixtures are removed and are compressed in a compactor 58 located within the containment area, as shown at step 14 in FIG. 1 of the drawings. The compression decreases the volume of the components to facilitate packaging for subsequent disposal.

As shown at step 16 in FIG. 1 of the drawings, non-friable asbestos containing materials, such as conduits, piping and ceiling grids, are removed next. Subsequent to removal, the ACM are cut or chopped into desired lengths at step 18, in a machine 60 located within the containment area in order to reduce the size of the ACM and thereby facilitate packaging for disposal.

The compressed and sized non-friable ACM are packaged at step 20 in special, tri-wall 750 pound boxes which are subsequently wrapped in multiple layers of poly sheeting. The boxed ACM is transported from the containment area to a disposal site. For example, the boxes may be loaded into 42 yd$^3$, closed-top octagon containers for transportation to a landfill.

Following the removal and packaging of the non-friable ACM, all non-load bearing block walls and partitions are demolished at step 22. Load bearing block walls may also be demolished at step 22 after appropriate shoring or reinforcement is provided within the containment area. The pieces of the demolished blocks are placed on a conveyor 62 which feeds the pieces to a heavy-duty grinder 64 which reduces the size of the block pieces to gravel-size pieces at step 24 of FIG. 1 of the drawings. Even though some portions of the block walls and partitions may not contain asbestos, it is time-consuming and costly to separate this material while maintaining complete compliance with asbestos removal requirements and, hence, all of the blocks are ground into gravel-size pieces in grinder 64 at step 24. Grinder 64 may discharge the gravel-size pieces directly into a suction hose connected to a standpipe for transmission to a Dumpster ® or other material receiving container located outside of the containment area.

A vacuum-loading device such as a VecLoader can be utilized to remove the gravel-size pieces created by grinder 64. The VecLoader operates on a vacuum cycle and a discharge cycle and material is sucked into the VecLoader from a standpipe in one cycle and discharged onto an airtight, watertight discharge conveyor in another cycle. The cycles must be separated to prevent clogging of the standpipe. The cycles are controlled electronically so that when the VecLoader is discharging, feed conveyor 62 for grinder 64 shuts down to maintain proper cycle sequence. The standpipe may be, for example, a 6-inch diameter, 11-gauge steel pipe and can be installed either inside or outside of the building. In a multistory, high-rise building, the standpipe may advantageously be installed in a building stairwell which permits the material to be easily removed from each floor and substantially eliminates airborne material during transfer.

The discharge conveyor from the vacuum-loading device includes a special structural steel roof having three separate manhole hatches and empties into an ACM container for safe transport of the material to a landfill. The ACM container is lined with a specially designed 32-mill-thick bladder bag prior to loading to provide proper ACM containment. This bladder bag exceeds the normal, 12-mill-thickness environmental requirement and eliminates the number of connections required for loading typical fiberboard barrels. An elongated track system may be used to facilitate positioning ACM containers for easy and rapid loading, and a hydraulic winch may be provided to move the ACM containers along the track system.

Following the removal of the gravel-size particles, at step 26 shown in FIG. 1 of the drawings, fireproofing and other asbestos containing materials adhering to the walls and ceiling within the containment area are removed. Initially, the ACM are removed by the asbestos removal device shown in FIGS. 3-7 of the drawings. The construction and operation of the asbestos removal device are discussed hereinafter. In general, the removal of the fireproofing and other adhering materials is accomplished by cylindrical rotary brushes. Fluid, such as water, under pressure, may be applied to the work area by a plurality of jets located in the head of the removal device, and negative pressure may be applied within the head through a direct connection to a VecLoader. Consequently, scraped material may be vacuumed directly into 32-mill bladder bags for disposal. ACM which cannot be removed by removal device 100 are subsequently removed by hand scraping at steps 28 and 30 in FIG. 1 of the drawings.

After the asbestos has been removed from all of the surfaces within the containment area, the surfaces are encapsulated with a special spray lock-down agent, as shown at step 32 in FIG. 1 of the drawings. Following encapsulation, the containment area is tested for compliance in order to certify that the containment area is asbestos free. The method may then be repeated on other floors of the building or in other areas on the same floor until the entire building is asbestos free.

FIGS. 3-7 of the drawings illustrate an asbestos removal device 100 which may be used in practicing the method of the present invention. The device 100 includes a housing 102 having a housing forming a chamber with an open face 103 which is adapted to be directed at a surface from which ACM are to be removed. The construction of the housing minimizes the amount of airborne ACM released into the containment area during operation. A pair of elongated, rotatable brushes 104 are mounted within housing 102 adjacent open face 103. Rotatable brushes 104 are mounted within the housing such that the peripheral contact portion of each brush extends through open face 103 beyond the edges of the housing as they rotate so that they contact and remove ACM from surfaces to which it adheres. An electric motor 106 drives each brush 104 through standard drive trains 107 located outside housing 102. A plurality of water injection nozzles 108 are mounted within housing 102 to discharge water jets adjacent to each rotatable brush 104.

A plurality of extendable, elongated legs 118 extend between the bottom of housing 102 and a movable carriage 122 mounted on wheels 130 on axles 131 to support housing 102. The number of extendable legs Will be determined by the size and shape of the housing. A pair of hydraulic pistons 110 are attached to carriage 122 and to legs 118 to pivot housing 102 relative to carriage 122 to change the orientation of housing 102 relative to the carriage. Legs 118 can be extended vertically to adjust the height of housing 102 relative to carriage 122. This arrangement provides great versatility for locating housing 102 relative to the surface to be cleaned.

A motor 140 drives two of the wheels 130, while a piston 142 is coupled to the axle 131 for the rear wheels 130 and is operable to pivot the rear wheels to provide for steering carriage 122. A control panel 144 allows the user to control the operations of asbestos removal device 100.

Housing 102 is connected to a discharge hopper 134 which is located opposite to open face 103. A flexible discharge conduit 136 has one end coupled to the outlet of hopper 134 and the other end connected to the inlet end of a pipe 138 which is attached to carriage 122. Asbestos removal device 100 can be coupled directly with a VecLoader by attaching a vacuum hose from the VecLoader to the discharge end of pipe 138. Alternatively, asbestos removal device 100 can discharge the ACM by gravity.

In operation, asbestos removal device 100 is positioned at the desired location on the floor within the containment area, and extendable legs 118 are adjusted to position open face 103 of housing 102 immediately adjacent to a surface from which ACM are to be removed so that brushes 104 are in contact with the ACM. When housing 102 is in position, electric motors 106 rotate the brushes to remove the ACM from the surface. The motors may drive the brushes in the same direction or in opposite directions, as desired. Additionally, high-pressure water jets from nozzles 108 assist the removal of ACM from the surface. It will be understood by those skilled in the art that air or another appropriate fluid may be discharged from the nozzles in place of the water.

While a specific embodiment of the invention has been described in detail herein, it will be appreciated by those skilled in the art that various modifications and alternatives to the embodiment may be developed in light of the overall teachings of the disclosure. Accordingly, the particular arrangement is illustrative only and is not limiting as to the scope of the invention which is to be given the full breadth of the appended claims and any and all equivalents thereof.

I claim:

1. A method for removing asbestos containing material from a building comprising:
    a) constructing a substantially enclosed containment area substantially surrounding the location from which said asbestos containing material is to be removed to confine said asbestos containing material within said containment area;
    b) removing compressible asbestos containing material located within said containment area;
    c) compressing said compressible asbestos containing material within said containment area;
    d) removing additional asbestos containing material from within said containment area;
    e) sizing said additional asbestos containing material within said containment area;
    f) packaging said compressed asbestos containing material and said sized asbestos containing material for removal from said containment area;
    g) demolishing removable block walls located within said containment area into pieces;
    h) grinding said pieces of said block walls into particles within said containment area;
    i) removing said particles from said containment
    j) removing adhering asbestos containing material from said building within said containment area;
    k) removing said asbestos containing material from said containment area; and
    l) encapsulating surfaces located within said containment area from which asbestos containing material has been removed with a lock-down agent.

2. The method of claim 1 wherein said removing adhering asbestos containing material includes:
    i) utilizing a device having a housing with an open face which is adapted to be located in proximity to a surface from which asbestos containing material is to be removed, said device including at least one rotatable brush mounted within said housing adjacent said open face, means for rotatably driving said rotatable brush, nozzle means within said housing adjacent said rotatable brush adapted to spray a fluid onto said asbestos containing material, a movable carriage for carrying said housing, adjustable means for supporting said housing having a first end attached to said housing and a second end attached to said movable carriage, and discharge means operatively coupled to said housing; and
    ii) manually removing asbestos containing material which is not removed by said device.

3. The method of claim 1 wherein said removal of particles from said containment area and said removal of asbestos containing material from within said containment area includes a vacuum system for conveying said particles and said asbestos containing material from said containment area to a vessel.

4. The method of claim 1 wherein said grinding comprises conveying portions of said pieces of said wall on a conveyor to a grinding machine which grinds said pieces of said wall into said particles and discharging said particles from said grinding machine to a conduit for transporting said particles out of said containment area.

5. The method of claim 1 wherein said compressible asbestos containing material includes ceiling tile and ceiling lights.

6. The method of claim 5 wherein said compressing of said compressible asbestos containing material is performed in a compacting machine.

7. The method of claim 1 wherein said compressible asbestos containing material includes conduit, piping and ceiling grid.

8. The method of claim 7 wherein said sizing of said asbestos containing material is performed in a chopping machine.

9. The method of claim 1 wherein said containment area includes a personnel decontamination system for allowing personnel to enter and exit said containment area, and an observation area for observation of said containment area without entering or exiting said decontamination system or said containment area.

10. A method for removing asbestos containing material from a building comprising:
    a) constructing a substantially enclosed containment area around a portion of the building from which said asbestos containing material is to be removed to provide substantially complete confinement of said asbestos containing material within said containment area;
    b) removing asbestos containing material located within said containment area;
    c) compressing said asbestos containing material within said containment area;

d) removing non-compressible asbestos containing material located within said containment area;
e) sizing said non-compressible asbestos containing material within said containment area;
f) packaging said compressed asbestos containing material and said sized asbestos containing material for removal from said containment area;
g) demolishing block walls located within said containment area into pieces;
h) grinding said pieces of said block walls into gravel-size particles at a location within said containment area;
i) removing said gravel-size particles from said containment area; and
j) encapsulating surfaces within said containment area from which asbestos containing material has been removed with a lock-down agent.

11. A method for removing asbestos containing material from a building comprising:
a) constructing a substantially enclosed containment area substantially surrounding a portion of the building from which said asbestos containing material is to be removed to provide confinement of said asbestos containing material within said containment area;
b) removing compressible, non-friable asbestos containing material located within said containment area;
c) compressing said compressible asbestos containing material within said containment area;
d) packaging said compressed asbestos containing material for removal from said containment area;
e) demolishing block walls located within said containment area into pieces;
f) grinding said block walls into particles within said containment area;
g) removing said particles from said containment area;
h) removing adhering asbestos containing material from said building within said containment area;
i) removing said asbestos containing material from said containment area; and
j) encapsulating surfaces within said containment area from which asbestos containing material has been removed with a lock-down agent.

12. A method for removing asbestos containing material from a building comprising:
a) constructing a containment area substantially surrounding a portion of the building from which said asbestos containing material is to be removed to provide confinement of said asbestos containing material within said containment area;
b) demolishing block walls located within said containment area into pieces;
c) grinding said pieces of said block walls into gravel-size particles within said containment area;
d) removing said gravel-size particles from said containment area;
e) removing adhering asbestos containing material from said building within said containment area;
f) removing said asbestos containing material from said containment area; and
g) encapsulating surfaces within said containment area from which asbestos containing material has been removed with a lock-down agent.

13. A method for removing asbestos containing material from a building comprising:
a) constructing a substantially enclosed containment area substantially surrounding a portion of the building from which asbestos containing material is to be removed to provide confinement of said asbestos containing material within said containment area;
b) removing compressible, non-friable asbestos containing material located within said containment area;
c) compressing said compressible, non-friable asbestos containing material within said containment area;
d) removing non-compressible asbestos containing material from within said containment area;
e) sizing said non-compressible asbestos containing material within said containment area;
f) packaging said compressed asbestos containing material and said sized asbestos containing material for removal from said containment area;
g) removing adhering asbestos containing material from said building within said containment area;
h) removing said asbestos containing material from said containment area; and
i) encapsulating surfaces within said containment area from which asbestos containing material has been removed with a lock-down agent.

14. A method for removing asbestos containing material from a building comprising:
a) constructing a substantially enclosed containment area substantially surrounding a portion of the building from which said asbestos containing material is to be removed to provide substantially complete confinement of said asbestos containing material within said containment area;
b) demolishing block walls located within said containment area into pieces;
c) grinding block from said block walls into particles within said containment area;
d) removing said particles from said containment area; and
e) removing adhering asbestos containing material from said containment area.

15. A method for removing asbestos containing material from a structure comprising:
a) erecting a containment area surrounding the portion of the structure wherein said asbestos containing material is located;
b) creating a negative pressure in said containment area;
c) compressing compressible asbestos containing material located within said containment area;
d) sizing non-compressible asbestos containing material located within said containment area; and
e) removing said asbestos containing material from said containment area.

16. A method as set forth in claim 15 including encapsulating surfaces within said containment area from which asbestos containing material has been removed.

* * * * *

UNITED STATES PATENT AND TRADEMARK OFFICE
CERTIFICATE OF CORRECTION

PATENT NO. : 5,302,004
DATED : April 12, 1994
INVENTOR(S) : David B. Docherty

It is certified that error appears in the above-indentified patent and that said Letters Patent is hereby corrected as shown below:

Column 4 Line 62 "Will" should read --will--.

Column 5 Line 68 after "containment" insert --area;--.

Signed and Sealed this

Twenty-sixth Day of July, 1994

Attest:

BRUCE LEHMAN

Attesting Officer     Commissioner of Patents and Trademarks